June 13, 1967  S. D. ROSS  3,325,697
SEALED CAPACITOR WITH NON-GAS PRODUCING ELECTROLYTE
Filed June 7, 1963

INVENTOR.
SIDNEY D. ROSS
BY
*Connolly and Hutz*
HIS ATTORNEYS 3,325,697
SEALED CAPACITOR WITH NON-GAS
PRODUCING ELECTROLYTE
Sidney D. Ross, Williamstown, Mass., assignor to Sprague Electric Company, North Adams, Mass., a corporation of Massachusetts
Filed June 7, 1963, Ser. No. 286,276
1 Claim. (Cl. 317—230)

The present invention relates to electrolytic capacitors and particularly to new and improved electrolytes for electrolytic capacitors.

Electrolytic capacitors require a liquid- and gas-tight seal so as to prevent loss of the electrolyte, creepage of the solute of the electrolyte, and also to prevent contamination of the electrolyte.

On the other hand, in a hermetically sealed capacitor hydrogen generated therein presents a pressure condition which must be coped with.

The prior art is replete with innovations designed to relieve the pressure or to prevent its further build-up. Some are of the "fail-safe" variety, such as those employing an internal mechanical cut-off, while others embody a relief or safety valve of one sort or another. All but a few of the prior art constructions permit some appreciable build-up of pressure prior to operation of the means designed to check this build-up. Safety and the need for long-term uninterrupted service dictates a continuing search for an economical, non-gassing capacitor.

It is an object of the present invention to present a hermetically sealed electrolytic capacitor not subject to the build-up of cathodically produced hydrogen gas.

It is another object of the present invention to produce an electrolytic capacitor operable over wide temperature ranges for extended periods without adverse changes in electrical properties.

Still another object of the invention is to present a hermetically sealed electrolytic capacitor employing a dual function electrolyte.

Still further objects of the present invention will be apparent from the following description and the accompanying drawing, in which:

FIGURE 2 shows the polarized type and FIGURE 3 the non-polarized type.

Figure 1:
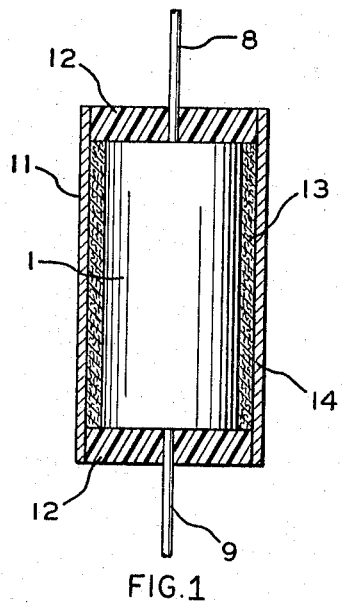
FIGURE 1 is a front elevation, in section, of a rolled foil electrolytic capacitor sealed within a can.

The aforesaid objects have been attained in accordance with this invention by employing in a hermetically sealed electrolytic capacitor an electrolyte comprising a solvent and a salt of a nonmetallic cation and a film-forming anion, said cation having at least one reducible group. The novel feature of the proposed electrolyte system resides in the cation. In an electric field the cations, which contain a reducible group, tend to concentrate at the cathode where hydrogen is generated. As hydrogen is formed the reducible group is reduced and thus the cations function as an effective scavenger for the gas, preventing any build-up of pressure.

The solvent of the electrolyte system can be any of the prior art solvents such as, ethylene glycol, dimethylformamide, dimethylacetamide, propylene carbonate, water, etc. Mixtures of solvents may also be employed.

As indicated above, the solutes for the solvents are salts of a nonmetallic cation and a film-forming anion, the cation having at least one reducible group. By the term "film-forming anion" is meant an ion readily reducible at the anode so as to effect repair of the oxide film should any injury of the film occur during operation, or if used in the formation process to produce the desired dielectric film. Contemplated anions include the pentaborates, phosphates, condensed polyphosphates, nitrates, thiocyanates, picrates, etc.

The nonmetallic cation having at least one reducible substituent can be introduced into the system via quaternary ammonium compounds, quaternary phosphonium compounds, sulfonium compounds and arsonium compounds. The reducible substituents incorporated in the nonmetallic cation include the nitro, quinone, carbonyl, nitroso, azoxy, azo, nitrile, etc. groups.

The following are examples of the foregoing cations:

(1) N-(2-4-dinitrophenyl)pyridinium ion
(2) p-nitrophenyltrimethylammonium ion
(3) p-nitrobenzyltriethylammonium ion
(4) m-nitrobenzyltriethylammonium ion
(5) $\alpha$-anthraquinonyltriethylammonium ion
(6) $\beta$-anthraquinonyltriethylammonium ion
(7) phenacyltriethylammonium ion Starting with the quaternary ammonium halide, the halide ion can be replaced by the subject anions by known procedures. Examples of these salts are:

N-(2,4-dinitrophenyl)pyridinium pentaborate
N-(2,4-dinitrophenyl) pyridinium phosphate
N-(2,4-dinitrophenyl)pyridinium polyphosphate
N-(2,4-dinitrophenyl)pyridinium nitrate
N-(2,4-dinitrophenyl)pyridinium thiocyanate
N-(2,4-dinitrophenyl)pyridinium picrate and corresponding salts having the above disclosed cations.

The solutes which are used in combination with the prior art solvents must exhibit suitable solubility in the particular combination with which they are used in order to be useful. The broad range in which the solute should be present in the system should be from 0.1% by weight to about 20% by weight of the total system. In most applications, it has been found that the range of primary usefulness is from about 2% to about 15% by weight of the total system. For the broad scope of the invention, it will be found that the conductivity of the electrolytes ranges from about 50 to about 10,000 ohmcentimeters.

Figure 2:
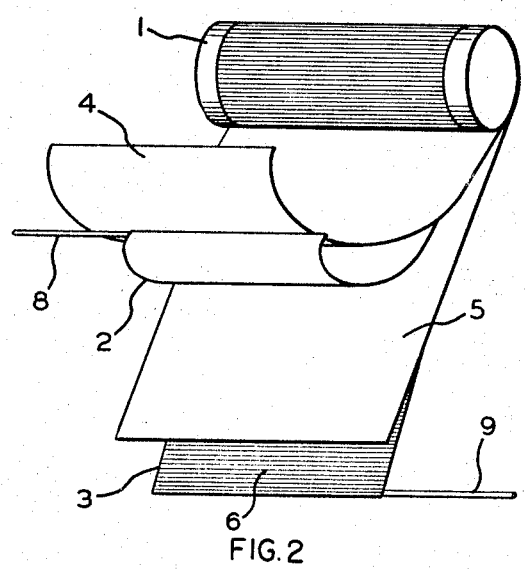
FIGURES 2 and 3 are perspective views of the capacitor section of FIGURE 1 removed from the can and partially unrolled to show its construction.
Figure 3:
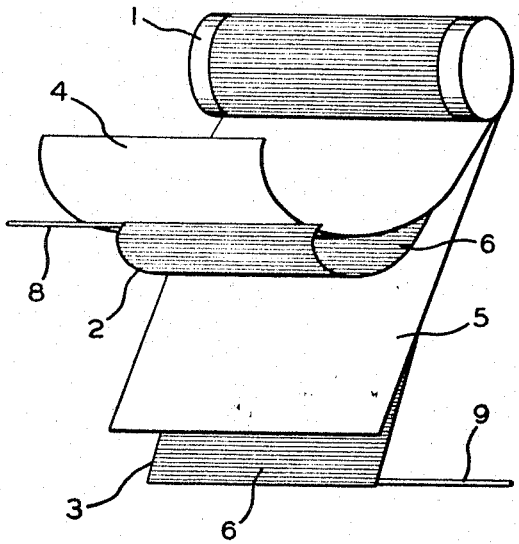

In the units depicted in FIGURES 1, 2 and 3 the capacitor section 1 is of the rolled foil type, being made up of a pair of foils 2 and 3 of a film-forming metal such as tantalum and spaced from one another by layers 4 and 5 of a calendered kraft paper. In FIGURE 2, which is directed to the polarized electrolytic construction, the anode 3 has an oxide film 6 on its surface, while the cathode foil 4 does not have an appreciable dielectric oxide coating. The non-polarized unit of FIGURE 3, for alternate current applications, has an oxide film 6 on both of the electrode foils 2 and 3. The assembly of foil and kraft paper is roller into a compact cylinder. Metal terminals 8 and 9, preferably of tantalum, are fastened to the ends of the respective foils as by spot welding or crimping. In this embodiment either aluminum, zirconium or other valve metals can replace tantalum. Any of the prior art spacer material may replace the kraft paper.

The capacitor section 1 is impregnated with an electrolyte of dimethylformamide containing 10% by weight of N-(2,4-dinitrophenyl)-pyridinium nitrate. This section is positioned within a tube of kraft paper 13 which is also saturated with the electrolyte. This combination is enclosed within a tubular can 11 of a suitable non-corrosive metal such as silver or silver plated copper. The terminals 8 and 9 extend from the respective ends of the can passing through resinous end seals 12 which confine the electrolyte to the wound section.

The effectiveness of the present electrolyte system is illustrated by the following test: An anode and cathode are positioned in a beaker containing aqueous ammonium nitrate as the electrolyte. A glass tube filled with the electrolyte and closed at the top is placed over the cathode. As current is passed through the system it will be noted that the amount of hydrogen generated at the cathode is directly proportional to the number of coulombs of current. When aqueous N-(2,4-dinitrophenyl)-pyridinium nitrate is employed as the electrolyte there is no observable hydrogen formation at the cathode.

Figure 4:
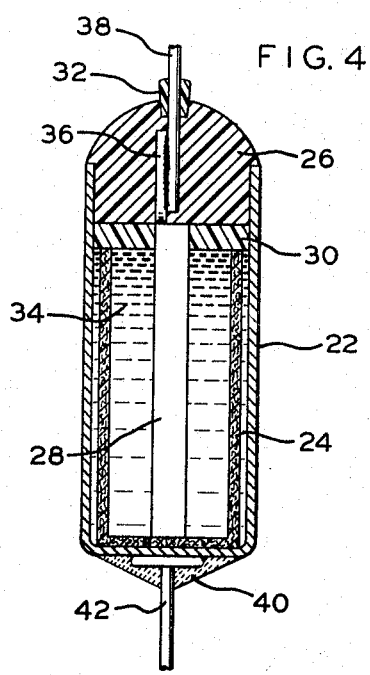
FIGURE 4 is a front elevation, in section, of an electrolytic capacitor having a wire anode.

In the unit depicted in FIGURE 4, the anode 28 is in the form of a tantalum oxide coated, etched tantalum wire. The anode 28 is positioned in an outer tubular can 22 of a non-corrosive metal such as silver. Within the can 22 is a spacer structure in the form of a paper tube 24 covering the inner surfaces of the can. The anode 28 has one end placed against the closed end of tube 24 and the other end encircled by a positioning gasket 30. Prior to placing the anode into the can the electrolyte 34, which is the same as that of the preceding embodiment, is placed in the container. The outer end of the anode wire is flattened as shown at 36 and a flexible lead wire 38 of nickel is welded to the flattened riser. A rigid resin material 26 is formed about this juncture and a resilient gasket 32 is positioned about the lead wire 38 to permit flex without cracking resin 26 and/or the welded junction. To the outside of the blind end of can 22, there is fastened by solder 40 a cathode lead 42.

The use of the subject electrolytes solves the problem of hydrogen gassing without sacrificing any electrical requirements. The units will have an excellent maximum operating temperature range, constancy of capacitance over this range and excellent power factor.

As is evident from the foregoing, the invention is not to be limited to formation of the rather specific illustrative devices. Modifications and variations, as well as the substitution of equivalents may be made without departing from the spirit of the invention as defined in the appended claim.

I claim:

An electrolytic capacitor comprising a first oxide coated electrode, a second electrode spaced from said first electrode, and an electrolyte in contact with said first electrode and said second electrode, said electrolyte comprising a solvent containing a salt of a non-metallic cation and a film-forming anion, said non-metallic cation is of a compound selected from the group consisting of quarternary ammonium compounds, quaternary phosphonium compounds, sulfonium compounds, and arsonium compounds; said cation having at least one reducible group selected from the class consisting of the nitro, quinone, carbonyl, nitroso, azoxy, azo and nitrile groups.

References Cited

UNITED STATES PATENTS

| | | | |
|---|---|---|---|
| 2,716,721 | 8/1955 | Houtz et al. | 317—230 |
| 2,739,275 | 3/1956 | Houtz et al. | 317—230 |
| 2,759,132 | 8/1956 | Ross | 317—230 |
| 2,801,221 | 7/1957 | Robinson | 317—230 |
| 2,866,139 | 12/1958 | Ross | 317—230 |
| 2,923,866 | 2/1960 | Wagner | 317—230 |
| 2,945,164 | 7/1960 | Taylor | 317—230 |
| 3,052,829 | 9/1962 | Ross et al. | 317—230 |

FOREIGN PATENTS 654,390   12/1962   Canada.

JAMES D. KALLAM, *Primary Examiner.*